United States Patent [19]

Zakic

[11] Patent Number: 4,541,792
[45] Date of Patent: Sep. 17, 1985

[54] DUAL LOOP TEMPERATURE CONTROL SYSTEM FOR RUBBER AND OTHER EXTRUDERS WITH OPTIONAL CONNECTION FOR HEAT PUMP

[75] Inventor: Paul Zakic, Akron, Ohio

[73] Assignee: NRM Corporation, Cleveland, Ohio

[21] Appl. No.: 492,936

[22] Filed: May 9, 1983

[51] Int. Cl.$^4$ .............................................. B29H 5/24
[52] U.S. Cl. ................................... 425/143; 425/144; 425/378 R; 425/379 R; 425/509
[58] Field of Search ................... 425/143, 144, 378 R, 425/379 R, 509

[56] References Cited

U.S. PATENT DOCUMENTS

| | | | |
|---|---|---|---|
| 3,259,175 | 7/1966 | Kraus et al. | 425/144 |
| 3,698,844 | 10/1972 | Grimm | 425/378 |
| 3,891,370 | 6/1975 | Giehler | 425/144 |
| 4,183,448 | 1/1980 | Nash | 425/379 R |
| 4,216,253 | 8/1980 | Bonnebat et al. | 425/144 |
| 4,272,466 | 6/1981 | Harris | 425/379 R |

*Primary Examiner*—Caleb Weston
*Attorney, Agent, or Firm*—Maky, Renner, Otto & Boisselle

[57] ABSTRACT

An extruder system includes a barrel surrounded by a jacket defining a plurality of zones. Other zones may be in the feed screw and downstream processes. A temperature control unit has a hot water circuit and a cold water circuit each with supply and return manifolds and valves which allow connection of each of the zones to receive either hot or cold water. Each circuit has a single heat exchanger which is used to heat or cool all the water circulating in the respective circuit. The two circuits may be interconnected by a heat pump so that waste heat from the cooling circuit is used by the heating circuit. In this case the heat exchangers become auxiliary. The system permits optimum energy reuse from heated areas to cooled areas, or vice versa, and minimizes additional energy requirements.

21 Claims, 3 Drawing Figures

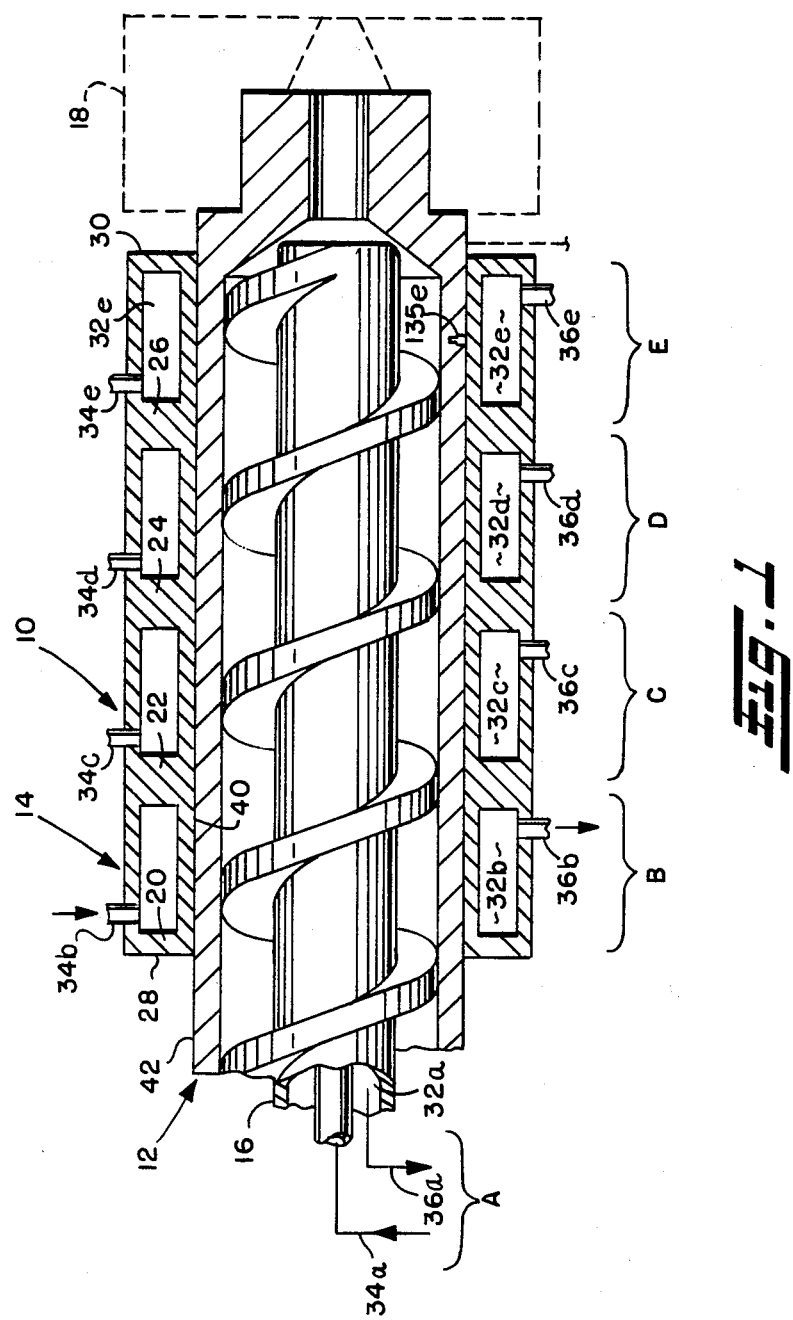

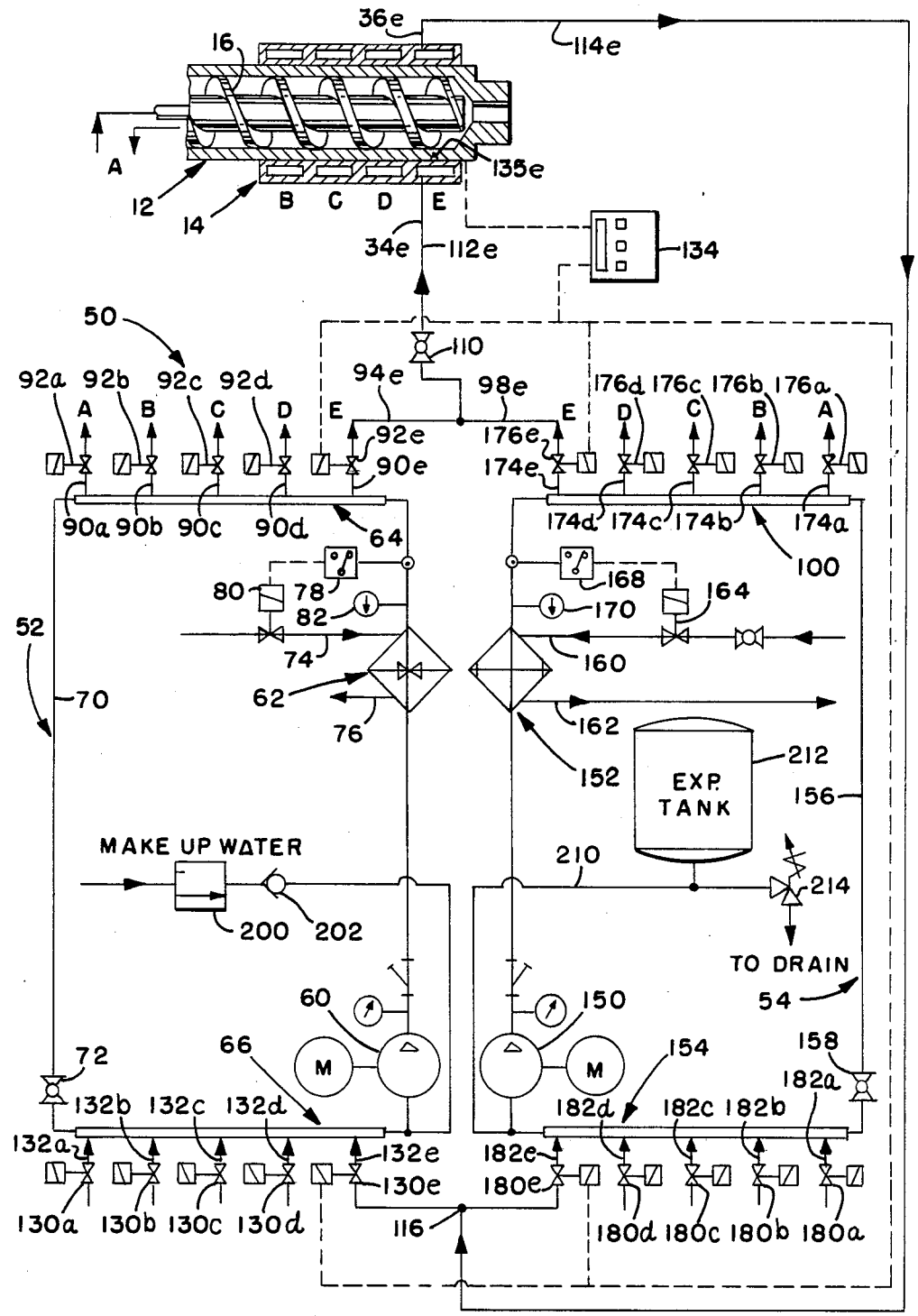

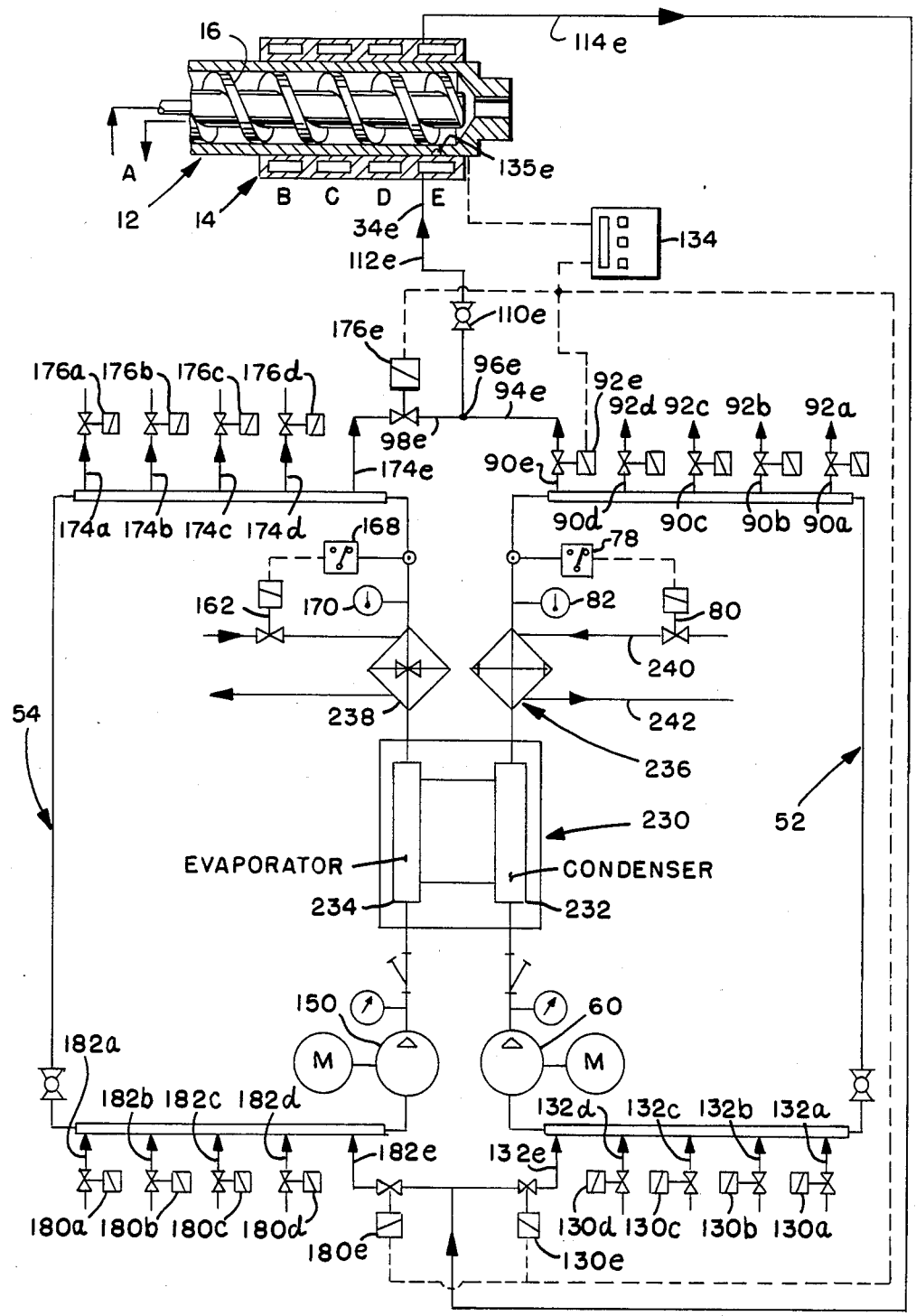

DUAL LOOP TEMPERATURE CONTROL SYSTEM FOR RUBBER AND OTHER EXTRUDERS WITH OPTIONAL CONNECTION FOR HEAT PUMP

BACKGROUND OF THE INVENTION

The present invention relates to extruders, and specifically the present invention relates to an extruder with an extruder barrel surrounded by a jacket with multiple zones each of which may be either heated or cooled.

In extruding rubber or plastic materials it is common to provide an extruder barrel with a jacket through which a heat transfer medium, usually water, is pumped. The jackets are divided into a number of different zones each covering a successive axial span along the length of the extruder barrel. Fluid, either hot or cold, is circulated through each zone to heat or cool the extrudate in the particular zone as required. Temperature responsive controls are provided to regulate the flow of fluid through the various jacket zones.

In these prior art extruders, each zone may have its own heating means and cooling means. Typically, a temperature control unit has a pump and two heat exchangers for each zone, one heat exchanger for heating and one for cooling. Valves direct the pumped liquid from one of the zones through one of the heat exchangers and back to the zone. Which heat exchanger is used depends on whether the zone requires heating or cooling. The two heat exchangers associated with each zone are not normally used simultaneously.

In addition to the inefficiency of using only one half of the heat exchangers at a time, excess capacity to heat or cool one or more zones is expensive to achieve. Typically, during extrusion of rubber or plastic some zones, say two out of five, may need cooling while the remaining zones may need heating. Which zones need which and how much may vary during an operational run of the extruder and between runs extruding different materials. In order to provide flexibility and some reserve capacity the heat exchangers and pump associated with one or two of the different zones of prior art temperature control units have been oversized. These would then be connected with any jacket zone that required extra heat or cooling. Such systems then required connecting and reconnecting of the temperature control unit with the extruder barrel whenever the jacket zones required extra heating or cooling capacity.

SUMMARY OF THE INVENTION

The present invention provides an extruder system with a barrel surrounded by a multi-zone jacket each zone of which may be supplied with heating or cooling fluid as desired for a particular process or run. Other zones such as that within the extruder's feed screw or those associated with downstream processes may also be heated or cooled. Excess capacity is easily provided and may be tapped automatically for any zone which requires it. The excess capacity is relatively inexpensive because it is shared among all of the zones. Additionally, the multi-zone extruder of the present invention is more efficient because heat extracted at cooling jacket zones may be used to heat the fluid which is circulated to heating jacket zones.

Specifically, the present invention provides an extruder with a temperature control unit for controlling the temperature at different controlled zones either in the jacket along the barrel, within the feed screw and-/or at downstream process locations. The temperature control unit includes two circuits for heat transfer fluid, a heating circuit and a cooling circuit. Each circuit includes a heat exchanger, a supply manifold, a return manifold, and a pump for circulating the fluid through the heat exchanger and the supply manifold to one of the controlled zones and back to the return manifold. Valves control the flow of fluid from the two supply manifolds through the respective zones and back to the return manifolds.

Since only one heat exchanger is used to heat and only one heat exchanger is used to cool all the zones, each is substantially larger than the individual heat exchangers for respective zones in prior art devices. However, because each of the heat exchangers of the present invention serves multiple zones, its capacity can easily be shared among the zones, and it is no longer necessary to have extra large heat exchangers and pumps associated with just one zone.

Additionally, the present invention may be provided with a heat pump interconnecting the two circuits. Heat extracted from controlled zones connected with the cooling circuit may be used to heat fluid for controlled zones that require heat, and vice versa. In this way waste heat is recycled and efficiency is increased.

The invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be carried out.

BRIEF DESCRIPTION OF THE DRAWINGS

In the drawings:

FIG. 1 illustrates schematically an extruder barrel with a heating jacket driving the barrel into zones and a feed screw with an internal zone;

FIG. 2 illustrates a first embodiment of an extruder system with a temperature control unit constructed in accordance with the present invention; and FIG. 3 illustrates a second embodiment of an extruder system with a temperature control unit constructed in accordance with the present invention.

DESCRIPTION OF PREFERRED EMBODIMENTS

The extruder 10 illustrated in FIG. 1 includes a barrel 12 surrounded by a temperature control jacket 14. A feed screw 16 mechanically driven turns within the barrel 12, converts a solid feed into a flowable extrudate and forces the extrudate out through die 18 in a conventional manner. The process and system requires careful temperature control. The extrudate may be natural rubber, synthetic rubber, or other thermoplastic or thermosetting material.

The feed screw 16 includes an internal passage 32a defining a zone, A, through which fluid may be circulated. The jacket 14 includes internal walls 20, 22, 24 and 26 in addition to end walls 28 and 30 which may divide the jacket into four zones B, C, D, and E extending successively axially along the length of the barrel 12. Within each zone B-D is an annular chamber 32b, 32c, 32d, and 32e, respectively. Fluid may be circulated from an inlet 34a, 34b, 34c, 34d, and 34e, respectively, through a respective zone A-E to an outlet 36a, 36b, 36c, 36d, and 36e, respectively. The jacket 14 is formed of welded steel, aluminum, or magnesium or any other material with good heat transfer properties, and it is formed with an interior cylindrical surface 40 which fits closely against the exterior cylindrical surface 42 of the barrel 12. The jacket may be separate semi-circular sections and the chambers may be serpentine passages through each section. The fluid circulated through each of the sections is preferably water, with various additives to reduce corrosion, as required. However, other fluids could be used.

The extruder 10 illustrated includes five zones A-E along the length of the barrel 12. However, there could be more or fewer zones. By circulating hot or cold fluid through the sections the temperature of the extrudate passing through the respective zones may be controlled, as is conventional. Further there are processes downstream of the die 18 for which heating or cooling of extrudate may be required, and these too may be considered "zones". Thus the term "zone" comprehends not only the various segments of the extruder barrel 14 and the feed screw zone A but also zones associated with downstream processes where heating or cooling is required.

FIG. 2 illustrates schematically a temperature control unit 50 for use with the extruder 10 of FIG. 1. It will be appreciated by those skilled in the art that the drawing of FIG. 2 is highly schematic and represents the functional relationship between the parts in a manner sufficiently clear to enable one to practice the present invention. However, the actual physical arrangement of the parts may differ substantially from the schematic arrangement shown in FIG. 2 while their functional relationships remain the same. Additionally, the connections between the temperature control unit 50 and only one zone, E, will be described in detail, as it will be understood clearly that similar connections are provided for the remaining zones A-D.

With this in mind, FIG. 2 shows the barrel 12 with the jacket 14 abutting against it. Water is admitted through inlet 34e into chamber 32e which surrounds the most downstream portion or zone of the cylinder barrel. The chamber 32e may have baffles or other internal dividers (not shown) to cause the fluid flowing from the inlet 34e to travel along a tortuous or serpentine path as noted above to improve heat transfer. Ultimately the water exits through outlet 36e. The water circulating through the chamber 32e may be either heating or cooling water. Typical incoming water temperatures for cooling purposes are approximately 90° F. while the outlet water temperature would be about 10° more. On the other hand if the water is being used for heating, it might typically have an inlet temperature of 160° and an outlet temperature of about 10° less.

The temperature control unit 50 includes a heating circuit 52 and a cooling circuit 54 which may be used to supply warmed or heated or cooled or chilled water, respectively, to the chamber 32e.

The continuously circulating heating circuit 52 or loop includes a pump 60, a heater or heat exchanger 62, a hot water outlet manifold 64 and a hot water return manifold 66. A return line 70 connects manifolds 64 and 66 through a needle valve 72.

The pump 60 is relatively large, for use with an extruder. The pump 60 may, for example, deliver 75 gallons per minute at 30 psi. This is large compared to the pumps used with individual zones in the prior extruder temperature controls which may deliver typically 15 gallons per minute at 30 psi. The pump used in the present invention for five heating zones has a rated capacity of five times the rated capacity of pumps normally used in prior devices for extruders of comparable size.

Should a particular process require heating at all five zones A-E, the pump 60 would provide the same heating capacity as provided by comparable prior devices. However, it is frequently the case that not all zones require heating. For example, it is common for only two zones to require heating. In this case the pump 60 would be required to deliver 30 gallons per minute, but because of its size it could do so at 47 psi. In this way the circuit 52 is able to provide more heating capacity than similarly proportioned prior devices. Moreover because the excess capacity is delivered to the manifold 64, it is available to all of the zones A-E. If any of the heated zones require more heating than can be delivered by water at the outlet temperature of the heat exchanger 62 at 15 gpm and 30 psi, the pump capacity is available to deliver extra water.

The pump 60 circulates water through heat exchanger 62 to be heated. The heat exchanger is supplied with a heating medium such as steam through inlet 74, and condensate returns through outlet 76. The heat exchanger 62 is also designed to provide excess capacity and has, in the illustrated embodiment, five times the capacity that would have been provided in a prior device to serve a single zone of the jacket 14. In the unusual situation where all five zones require heat, the heat exchanger 62 has the same capacity as the prior units. However, in the more usual situation where one or more zones A-E of the jacket 14 do not require heat, the heat exchanger 62 provides excess capacity. In the same manner as discussed above with respect to the pump 60, the excess capacity of the heat exchanger 62 may be automatically tapped by any zone A-E which requires it.

The flow of steam into inlet 74 and condensate out of outlet 76 of the heat exchanger 62 is controlled by a thermostatic switch 78. The thermostatic switch 78 senses the temperature of the water leaving the heat exchanger 62 and controls the steam flowing through inlet 70 by means of a solenoid operated valve 80. A thermometer 82 is provided to assist in regulating the thermostatic switch 78.

Of course it will be appreciated that the heat exchanger 62 may utilize electricity, a gas burner, or some medium other than steam to heat the fluid.

After leaving the heat exchanger 62, the hot water flows to the hot water outlet manifold 64. The hot water outlet manifold 64 has five outlets 90a, 90b, 90c, 90d, and 90e which correspond with the jacket zones A-E. Each outlet 90a-e is provided with a solenoid valve 92a-92e, respectively. The solenoid valves 92a-92e control the water flow from the respective outlet 90a-e toward the jacket 14.

The conduit 94e leading from solenoid valve 92e is joined at a T-fitting 96e with a conduit 98e connected with cold water outlet manifold 100. The hot water flows through shut-off valve 110e through conduit 112e to the chamber 32e to heat the extrudate as it flows through zone E of the extruder barrel 12. The water leaves through jacket outlet 36e traveling through return line 114e, now cooler than it was when it entered the jacket inlet 34e because it has given up heat to the extrudate.

The return line 114e joins a T-fitting 116e and from there fluid flows through valve 130e into an inlet 132e of the hot water return manifold 66. The hot water return manifold 66 has five inlets 132a–132e which correspond with the five outlets 90a–90e of the hot water outlet manifold 64 and which receive returning hot water from the respective zones A-E. Each of the inlets 132a–132e is provided with a solenoid operated valve 130a–e, respectively.

The valves 92e and 130e are solenoid operated valves, and in one embodiment they are simply on/off valves, although proportional control valves may be employed. The inlet valve 130e and the outlet valve 92e are operated in parallel by a controller 134 which includes a temperature sensor or thermocouple 135e mounted directly in the barrel 12 in a deep well position to be in a location in zone E as close to the extrudate as possible, as seen also in FIG. 1. A similar thermocouple, not shown, is provided for each zone and is appropriately connected to the controller. The controller then opens or closes the inlet valve 130e and the outlet valve 92e accordingly at the same time.

The cold water circuit or loop 54 is much like the hot water circuit 52. A cold water pump 150 of the same size and capacity as the pump 60 circulates water to a heat exchanger 152, the cold water outlet manifold 100, the chambers 32a–32e of the jacket 14, and back to the cold water return manifold 154. A return line 156 and needle valve 158 corresponding to return line 70 and valve 72 of the hot water circuit are also provided.

The heat exchanger 152 has an inlet 160 into which cool water may be fed and an outlet 162 from which the water, now slightly warmed by having exchanged its heat with the water circulated by pump 150, returns. The flow of cold water to inlet 160 is controlled by solenoid operated valve 164 which in turns responds to a thermostatic switch 168 which corresponds generally to the thermostatic switch 78. Also, a thermometer 170 is provided to assist in adjustment of the thermostatic switch 68. Cooled water leaving the heat exchanger 152 then travels to the cold water outlet manifold 100 which is provided with an outlet 174a–e for each of the zones A-E of the extruder barrel 12. Each of the outlets 174a–174e is provided with a solenoid operated valve 176a–176e which is operated by the controller 134.

When the solenoid operated valve 176e is open in response to a signal from the controller 134, cold water flows from the cold water outlet manifold 100 through the outlet 174e, the solenoid operated valve 176e, the conduit 98e, the T-fitting 96e and into the chamber 32e in zone E of the extruder barrel. The solenoid valve 92e is in this case closed by controller 134 to prevent the cold water from flowing back into the hot water outlet manifold 64. From the chamber 32e surrounding zone E of the extruder barrel 12, the cold water flows through return line 114e to T-fitting 116e. From there, the cold water returns through solenoid valve 180e to inlet 182e of the cold water return manifold 154.

The controller 134 is used to operate the solenoid operated valves 92a–e, 130a–e, 176a–e and 180a–e. The controller 134 has the noted thermocouples (only one, 135e, shown) in each of the zones A-E. The controller 134 may be programmed to circulate either hot or cold water through each of the zones. When the temperature in a particular zone requiring heating falls below the lower adjustable set point of a range, the appropriate pair of valves 92a–e and 130a–e is opened to circulate hot water to raise the temperature in that zone. This may continue until an upper adjustable set point is achieved. On the other hand, in a cooling zone when the temperature rises above a predetermined set point, the solenoid operated valves 176a–e and 180a–e corresponding to the zone in question are opened to circulate cold water through the appropriate chamber until a lower adjustable set point is achieved.

From the above, it should be clear that with respect to any one zone, e.g. zone E, only one circuit, either the heating circuit 52 or the cooling circuit 54 is used at any particular time. This is accomplished by opening the solenoid valves of one circuit, e.g. 176e and 180e, while the corresponding valves of the other circuit, 92e and 130e, remain closed. When valves 176e and 180e are open cold water cannot flow into the hot water outlet manifold 64 because valve 92e is closed. It must flow through the chamber 32e, through return line 114e to the T-fitting 116e. From there, the cold water flows through open valve 180e and into the cold water return manifold 154 because the solenoid operated valve 130e is closed, blocking the path to the hot water return manifold 66. Similarly, when operated in a heating mode, valves 176e and 180e are closed and valves 92e and 130e are open. Hot water then leaves the hot water outlet manifold 64 flowing through open valve 92e, through chamber 32e and return line 114e to the T-fitting 116e. The hot water cannot enter the cold water return manifold 154 because the valve 180e blocks its way. The hot water then returns through valve 130e which is open and into the hot water return manifold 66. Closed valve 180e prevents its entry into the cold water return manifold 154.

The embodiment illustrated in FIG. 2 has been described in detail with respect to the valves and conduits necessary to heat or cool zone E of the extruder barrel 12. It should be obvious that each of the other zones A-D is heated or cooled by means of similar conduits and controls which have been omitted from the drawing for the purposes of clarity and which are not further described here to avoid prolixity of description.

The hot and cold water circuits or loops 52 and 54 include some additional elements. Make-up water is provided through pressure regulated valve 200 which may be set at approximately 20 psi. Water from a supply travels through the pressure regulated valve 200 and check valve 202 into the hot water circuit 52 just upstream of the pump 60 whenever the pressure within the hot water circuit falls below 20 psi. Branching off the cold water circuit 54 immediately upstream of the pump 150 is a conduit 210 which leads to a conventional expansion tank 212 and a pressure relief valve 214 may be set at about 80 psi.

FIG. 3 illustrates a second embodiment of the present invention, and similar reference numerals are used to identify similar components. In the embodiment of FIG. 3 a heat pump 230 is used to interconnect the hot water circuit or loop 52 and the cold water circuit or loop 54, and the heat exchangers 236 and 238 become auxiliary, operating only when the heat given up by cooled zones is not substantially in balance with heat absorbed in heated zones, or vice versa.

Heated water circulated by pump 60 passes through the condenser 232 of the heat pump 230 where it is heated while cold water circulated by the pump 150 passes through the evaporator 234 of the heat pump where it is cooled. By interconnecting the hot and cold water circuits 52 and 54 energy is saved because the excess heat drawn out from the extrudate by circulating cold water through some of the chambers 32a–32e is reclaimed and used to heat the water which circulates around others of the chambers 32a–32e in the feed screw 14 and in the jacket 14 surrounding the extruder barrel 12. Thus heat removed from some of the zones A-E of the extruder is returned to other zones.

In the FIG. 3 embodiment heat exchangers 236 and 238 in the hot and cold water circuits, respectively, have reversed roles from those in the embodiment illustrated in FIG. 2. Specifically, in the hot water circuit 52 where the heat exchanger 62 (FIG. 2) was used to add heat, now the heat exchanger 236 (FIG. 3) is used to cool water circulated by pump 60. Similarly, the heat exchanger 152 (FIG. 2) in the cold water circuit 54 of FIG. 2 is used to cool water pumped by pump 150. In the embodiment illustrated in FIG. 3, the heat exchanger 238 in the cold water circuit 54 is used to heat fluid pumped by pump 150.

The reversal of roles of the heat exchangers is a natural consequence of using a heat pump 230. For example, when the amount of heat per unit time extracted from the cooled zones, e.g. zones A and B, is equal to the amount of heat added per unit time in the heated zones, e.g. zones C, D, and E, the system is in substantial balance and no fluid need be circulated through either of the heat exchangers 236 and 238.

Now suppose that the demand for cooling exceeds the demand for heating. This can be most easily understood by taking an extreme case where all of the hot water manifold valves 92a-92e and 130a-130e are closed: there is no demand for heating. However, because of demand for cooling, the condenser 232 of the heat pump 230 is putting out heat, i.e., the heat extracted by the evaporator 234 from fluid circulating through the cooling circuit 54. The heat from the condenser 232 heats the water being circulated by pump 60 causing its temperature to increase. This heat must be removed from the water in the hot water circuit 52 if the evaporator 234 is to continue operating effectively. Therefore, the rising temperature of the water in the hot water circuit 52 is sensed by thermostatic switch 78 which in turn opens valve 80 allowing cooling water to flow through inlet 240 through heat exchanger 236 and out return line 242.

In the opposite situation, where there is no demand for cooling and all of the solenoid valves 176a-e and 180a-e are closed the evaporator 234 and the water circulated by pump 150 gets very cold because the heat from them is being extracted by the heat pump 230 and supplied to the hot water circuit 52. In order for the heat pump 230 to continue operating, heat must be added to the water circulating through the cold water circuit 54. This is done by means of the heat exchanger 238. As the temperature in the cold water circuit 54 falls, thermostatic switch 168 opens the valve 162 allowing steam to circulate through the heat exchanger 238 which warms the water circulating in the cold water circuit. Thus the heat exchangers 236 and 238 are auxiliary in that they function as an additional heat sink and heat source, respectively, when the consumption and production of heat in the extruder barrel 12 are not substantially balanced.

Thus it is clear that the present invention provides an extruder 10 (FIG. 2) with a multi-zone jacket 14 surrounding its barrel 12 supplied with heating or cooling fluid as desired for a particular process or run. Excess capacity of both pumps 60 and 150 and heat exchangers 62 and 152 is easily provided and may be tapped automatically for any zone A-E or a downstream process zone which requires it. This excess capacity is relatively inexpensive because it is shared among all of the zones.

Additionally, the multi-zone extruder 10 of the present invention is more efficient than the prior art types because heat extracted at cooling jacket zones may be used to heat the fluid which is circulated to heating jacket zones when a heat pump 230 (FIG. 3) is provided.

Specifically, the present invention provides a rubber extruder 10 (FIG. 2) with a temperature control unit 50 for controlling different jacket zones A-E along the barrel 12 and in the feed screw zone or downstream process zones. The temperature control unit 50 includes two circuits for heat transfer fluid, a heating circuit 52 and a cooling circuit 54. Each circuit includes a heat exchanger 62, 152, a supply manifold 64, 100, a return manifold 66, 154, and a pump 60, 150 for circulating the fluid through the respective heat exchanger and supply manifold to one of the zones on the extruder barrel and back to the return manifold. Valves 92a-e, 130a-e, 176a-e, and 180a-e control the flow of liquid from the supply manifolds through the respective zones and back to the return manifolds.

Since only one heat exchanger 62 is used to heat and only one cooling heat exchanger 152 used to cool all the zones, each is substantially larger than the individual heat exchangers for each zone in prior units. However, because each of the heat exchangers 62, 152 of the present invention serves multiple zones, its capacity can easily be shared among the zones, and it is no longer necessary to have extra large heat exchangers and pumps associated with just one zone. Moreover, if it is desired to increase the capacity of the temperature control unit 50 only one pump 60, 150 and one heat exchanger 62, 152 in each circuit 52, 54 need be changed. This is considerably easier than in prior units which would require changing two heat exchangers and a pump for each zone.

Additionally, the present invention may be provided with a heat pump 230 (FIG. 3) interconnecting the two circuits 52, 54. Heat extracted from any controlled zone connected with the cooling circuit 54 is used to heat fluid for controlled zones that require heat, and vice versa. In this way waste heat is recycled and efficiency is increased.

In actual construction the supply and return manifolds may be positioned vertically and substantially adjacent each other with the smaller interconnecting lines 70 and 156 being quite short. This provides a highly compact package taking substantially less floor space and height compared to conventional temperature control units. In addition to easy part replacement, it should be noted that the manifolds are modular in construction, being really nothing more than a series of interconnected Tees. Thus it is simple to add to or remove zones from the system. The system then also has an advantage regarding stocking expenses by reducing the variety of parts required to a minimum.

The following is claimed:

1. An extruder having a barrel through which extrudate is extruded,
    said extruder including multiple zones,
    a source of hot fluid,
    a source of cold fluid,
    means for connecting each zone to both said sources, and
    means for selectively causing either hot fluid or cold fluid from said sources to flow through each of the zones thereby to control the temperature of the extrudate passing through each of said zones.

2. The extruder of claim 1 wherein each said zone includes a single fluid inlet and a single fluid outlet.

3. The extruder of claim 2 wherein said source of hot fluid includes a heat exchanger, a hot fluid supply manifold, a hot fluid return manifold, a hot fluid pump for circulating fluid through said heat exchanger and said supply and return manifolds, and valve means for selectively controlling the flow from said supply manifold through each of the zones to said return manifold.

4. The extruder of claim 3 wherein said source of cold fluid includes a heat exchanger, a cold fluid supply manifold, a cold fluid return manifold, a cold fluid pump for circulating fluid through said heat exchanger and said cold fluid supply and return manifolds, and valve means for selectively controlling the flow from said supply manifold through each of the zones to said return manifold.

5. The extruder of claim 4 wherein said heat exchanger in said source of hot fluid includes means for heating fluid circulated by said hot fluid pump and said heat exchanger in said source of cold fluid includes means for cooling fluid circulated by said cold fluid pump.

6. The extruder of claim 5 wherein said valve means includes a pair of selectively operable valves for each zone.

7. The extruder of claim 4 including a heat pump connecting said sources of hot and cold fluid.

8. The extruder of claim 7 wherein said heat exchanger in said source of hot fluid includes means for cooling fluid circulated by said hot fluid pump and said heat exchanger in said source of cold fluid includes means for heating fluid circulated by said cold fluid pump.

9. The extruder of claim 8 wherein said valve means includes a pair of selectively operable valves for each zone.

10. A temperature control unit for an extrusion process having a plurality of zones which require either heating or cooling, said temperature control unit comprising a heating circuit circulating hot fluid, a cooling circuit circulating cool fluid, each of said circuits having a supply manifold and a return manifold, conduit means for connecting in parallel each of the zones with both of the supply manifolds and with both of the return manifolds, and valve means for directing either hot fluid or cool fluid through said conduit means to each of said zones.

11. The temperature control unit of claim 10 wherein each of said circuits includes a heat exchanger.

12. The temperature control unit of claim 11 wherein said heat exchanger in said heating circuit includes means for heating the fluid in said circuit and said heat exchanger in said cooling circuit includes means for cooling the fluid in said circuit.

13. The temperature control unit of claim 11 wherein each of said circuits includes a pump.

14. The temperature control unit of claim 10 wherein said valve means includes two pairs of selectively operable valves for each of said zones one of said pairs of valves being in said heating circuit and the other of said pairs of valves being in said cooling circuit.

15. The temperature control unit of claim 14 wherein in said heating circuit for each of said zones one of said pair of valves is located in said conduit means between said heating circuit supply manifold and the respective zone and the other one of said pair of valves is located between the respective zone and said heating circuit return manifold.

16. The temperature control unit of claim 15 wherein in said cooling circuit for each of said zones one of said pair of valves is located in said conduit means between said cooling circuit supply manifold and the respective zone and the other of said pair of valves is located in said conduit means between the respective zone and said cooling circuit return manifold.

17. A temperature control unit for an extrusion process having a plurality of zones which require either heating or cooling, said temperature control unit comprising a heating circuit circulating hot fluid, a cooling circuit circulating cool fluid, each of said circuits having a supply manifold and a return manifold, conduit means for connecting each of the zones with both of the supply manifolds and with both of the return manifolds, valve means for directing either hot fluid or cool fluid through said conduit means to each of said zones, and control means for sensing the temperature of the extrudate in each of said zones and controlling said valve means in response thereto.

18. The temperature control unit of claim 14 wherein said control means opens only one pair of the selectively operable valves associated with each zone at one time.

19. The temperature control unit of claim 18 wherein said heating and cooling circuits are interconnected by a heat pump.

20. The temperature control unit of claim 19 wherein each of said circuits includes an auxiliary heat exchanger.

21. The temperature control unit of claim 20 wherein the auxiliary heat exchanger in said heating circuit includes means for cooling the fluid flowing through said heating circuit and said auxiliary heat exchanger in said cooling circuit includes means for heating the fluid flowing through said cooling circuit.

* * * * *